(12) United States Patent
Rakshit

(10) Patent No.: US 11,902,722 B2
(45) Date of Patent: Feb. 13, 2024

(54) RELATIVE POSITION-BASED INFORMATION DELIVERY

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/939,109

(22) Filed: Jul. 27, 2020

(65) Prior Publication Data
US 2022/0030337 A1 Jan. 27, 2022

(51) Int. Cl.
*H04Q 11/00* (2006.01)
*H04B 10/116* (2013.01)
*H01Q 3/38* (2006.01)

(52) U.S. Cl.
CPC .......... *H04Q 11/0066* (2013.01); *H01Q 3/38* (2013.01); *H04B 10/116* (2013.01)

(58) Field of Classification Search
CPC ............... H04B 10/116; H04J 14/0213; H04Q 11/0066
See application file for complete search history.

(56) References Cited

U.S. PATENT DOCUMENTS

| | | | |
|---|---|---|---|
| 9,838,119 B1* | 12/2017 | Stein | G01S 3/7835 |
| 9,876,770 B1 | 1/2018 | Ekambaram | |
| 2007/0031151 A1* | 2/2007 | Cunningham | H04B 10/1123 398/131 |
| 2011/0261357 A1* | 10/2011 | Horiguchi | G01J 3/18 356/328 |
| 2014/0248058 A1* | 9/2014 | Simpson | H04B 13/02 398/104 |
| 2015/0304032 A1* | 10/2015 | Hyde | H04B 10/116 398/118 |
| 2016/0072580 A1* | 3/2016 | Wabnig | H04L 9/0852 398/131 |
| 2020/0053513 A1* | 2/2020 | Harris | H04B 10/1129 |
| 2020/0322047 A1* | 10/2020 | Barnett | H04B 10/116 |
| 2020/0374003 A1* | 11/2020 | Walker | H04J 14/0213 |

FOREIGN PATENT DOCUMENTS

WO 2019106385 A1 6/2019

OTHER PUBLICATIONS

"Diffraction grating", Wikipedia, last edited on Mar. 10, 2020, 7 pages, <https://en.wikipedia.org/wiki/Diffraction_grating>.
"How Colour Changing LEDs Work", Kitronik, downloaded from the internet on Mar. 13, 2020, 1 page, <https://www.kitronik.co.uk/blog/how-colour-changing-leds-work/>.

(Continued)

*Primary Examiner* — Pranesh K Barua
(74) *Attorney, Agent, or Firm* — David K. Mattheis

(57) ABSTRACT

Delivering information according to a recipient's location by modulating an optical carrier according to a data set, transmitting the optical carrier in a first direction, altering the path of the carrier wave according to an optical carrier wavelength, receiving recipient location information, and altering the optical carrier wavelength or optical carrier path according to the recipient location information.

20 Claims, 5 Drawing Sheets

(56) References Cited

OTHER PUBLICATIONS

"LiFi Technology", Copyright pureLiFi 2020, downloaded from the internet on Mar. 13, 2020, 9 pages, <https://purelifi.com/lifi-technology/>.

"Tutorial: Diffraction Grating Physics", Copyright 2020 Newport Corporation, downloaded from the internet on Mar. 13, 2020, 7 pages, <https://www.newport.com/t/grating-physics>.

Bonod et al., "Diffraction gratings: from principles to applications in high-intensity lasers", Advances in Optics and Photonics, 2016, 40 pages, <https://hal.archives-ouvertes.fr/hal-01330435>, submitted on Jul. 19, 2018.

Chatterjee et al., "Scope and Challenges in Light Fidelity(LiFi) Technology in Wireless Data Communication", International Journal of Innovatice Research in Advanced Engineering (IJIRAE), Jun. 2015, 9 pages, Issue 6 vol. 2, <https://www.ijirae.com/volumes/Vol2/iss6/01.JNAE10083.pdf>.

Lister, John, "How Does a Color Changing LED Work", Hunker, downloaded from the internet on Mar. 13, 2020, 6 pages, <https://www.hunker.com/12000414/how-does-a-color-changing-led-work>.

Mell et al., "The NIST Definition of Cloud Computing", Recommendations of the National Institute of Standards and Technology, Special Publication 800-145, Sep. 2011, 7 pages.

Mundy et al., "What is Li-Fi?", 5G.co.uk, last updated Oct. 16, 2018, 5 pages, <https://5g.co.uk/guides/what-is-li-fi/>.

Puiu, Tibi, "Dutch researchers demonstrate 42.8 gbps connection using Li-Fi. It's 100 times faster than the best Wi-Fi", ZME Science, Mar. 21, 2017, 6 pages, <https://www.zmescience.com/science/news-science/heres-the-future-of-lifi/>.

Wang et al., "Highly Efficient Optical Beam Steering Using an In-Fiber Diffraction Grating for Full Duplex Indoor Optical Wireless Communication", Journal of Lightwave Technology, Oct. 1, 2018, 8 pages, vol. 36 No. 19, <https://ieeexplore.ieee.org/stamp/stamp.jsp?tp=&arnumber=8353382>.

\* cited by examiner

RELATIVE POSITION-BASED INFORMATION DELIVERY

BACKGROUND

The disclosure relates generally to delivering information according to a recipient's location. The disclosure relates particularly to concurrently delivering different information to different locations.

Light fidelity (Li-Fi) utilizes light to transmit data between a sender and a receiver. Li-Fi utilizes an optical wavelength electromagnetic radiation carrier from light emitting diodes (LEDs) modulated with the data payload and transmitted between the sender and receiver. The receiver captures the light and demodulates the data signal from the light carrier.

Diffraction separates electromagnetic radiation according to wavelength. A signal including several different electromagnetic wavelengths interacts with a diffraction element, a grating or diffraction prism, and the separated components leave the diffraction element at angles dependent upon their wavelength. Each wavelength leaving the diffraction element at a different angle.

Due to the short wavelengths of optical electromagnetic radiation, a diffraction grating can separate white light (a signal including at least red, green and blue (RGB) radiation) into its individual components, each component leaving the grating at a different angle. Optical carrier radiation also has a high data carrying capacity due to the short wavelengths.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the delivery of information according to the location of a recipient relative to a sender.

Aspects of the invention disclose methods, systems and computer readable media associated with delivering information according to a recipient's location by modulating an optical carrier according to a data set, transmitting the optical carrier in a first direction, altering the path of the optical carrier according to a carrier wavelength, receiving recipient location information, and altering the optical carrier wavelength or optical carrier path according to the recipient location information.

Aspects of the invention disclose methods, systems and computer readable media associated with delivering information according to a recipient's location by modulating a plurality of carriers according to a plurality of data sets, transmitting the combined carriers in a first direction, altering the path of a carrier according to a carrier wavelength, receiving recipient location information, and altering the carrier wavelength or carrier path according to the recipient location information.

Aspects of the invention disclose methods, systems and computer readable media associated with delivering information according to a recipient's location by modulating an optical carrier according to a data set, transmitting the optical carrier in a first direction, altering the path of the optical carrier according to a carrier wavelength, receiving directional contextual need information, and altering the optical carrier wavelength or optical carrier path according to the directional contextual need information.

Aspects of the invention disclose methods, systems and computer readable media associated with delivering information according to a recipient's location by receiving an optical carrier modulated according to a data set, demodulating the data set from the optical carrier, receiving direction-based contextual need information associated with the data set, associating the data set with a location relative to a sender according to the direction-based contextual need information, and presenting the data set according to the relative location.

Aspects of the invention disclose methods, systems and computer readable media associated with delivering information according to a recipient's location by receiving an optical carrier modulated according to a data set, demodulating the data set from the optical carrier, associating the data set with a location relative to a sender, and presenting the data set according to the relative location.

Aspects of the invention disclose methods, systems and computer readable media associated with delivering information according to a recipient's location by receiving an optical carrier modulated according to a data set, demodulating the data set from the optical carrier, associating the data set with a location relative to a sender, and presenting the data set together with an indication of the relative location.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., modulating data onto an optical carrier signal, determining direction-based contextual information needs, determining a receiver's relative location, altering a diffraction elements' position according to the receiver's location, etc.). These solutions are not abstract and cannot be performed as a set of mental acts by a human due to the processing capabilities needed to facilitate endpoint device remediation, for example. Further, some of the processes performed may be performed by a specialized computer for carrying out defined tasks related to delivering information according to a receiver's location. For example, a specialized computer can be employed to carry out tasks related to delivering information according to a receiver's relative location, or the like.

Li-Fi system utilize optical wavelength carriers for the wireless communication of data. The systems modulate payload data onto optical carrier signals for transmission, then the receivers demodulate the carrier, extracting the payload data. The relatively high frequency of optical carriers relative to radio frequencies, offers a higher payload data capacity. In an embodiment, LEDs provide the optical carriers for wirelessly transmitting data. In this embodiment, the disclosed systems modulate data onto optical carriers provided by each of a red, green, and blue led. In an embodiment, additional single frequency LEDs are added to increase the number of different directional angles available for the output. In this embodiment, each additional LED emits a single frequency output and that output results in another output angle.

Figure 1:
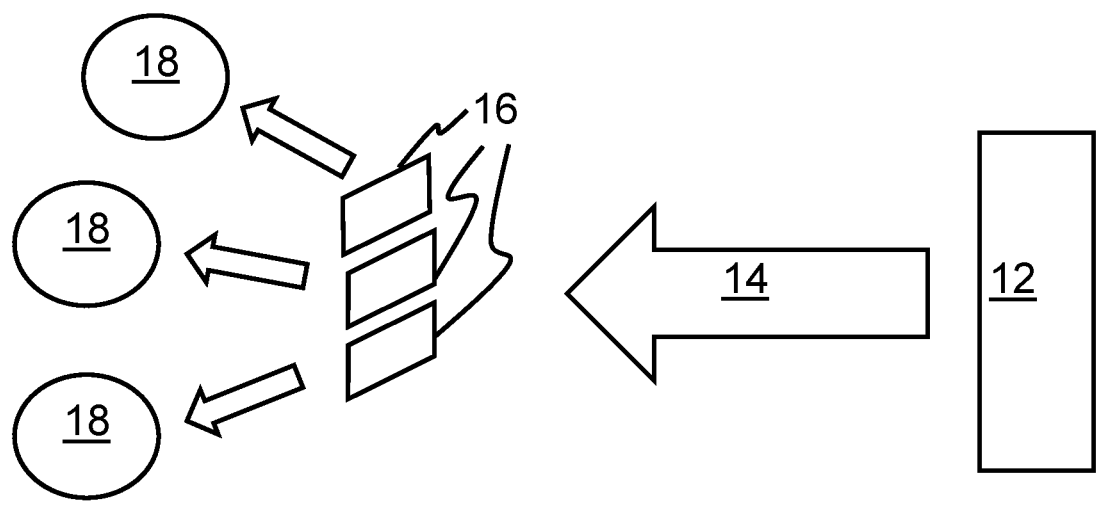
FIG. 1 provides a schematic illustration of a system, according to an embodiment of the invention.

The Li-Fi system illustrated in FIG. 1 includes a computing environment configured to modulate the optical carrier LED output with data from digital files. Any digitized file data may be modulated as payload onto the optical carrier LED output. In an embodiment, each LED color receives a different payload file of data. In this embodiment, the payload files include direction-based data. Each data file has a contextual relationship with a particular direction, a contextual need associated with the direction. The direction refers to the positional relationship between the source of the combined optical carriers and respective receivers of the signals. As an example, a communication system includes a set of adjustable diffraction elements 16 disposed in the path 14 of a set of red, green, and blue LEDs from a data source 12. Each LED output includes a distinct data file. Each data file relates to a particular audience segment. The respective audience segments are differentiated by their locations relative to the source LEDs. Each of three audience members 18 has a different relative location with respect to the carrier source. One or more diffraction elements interact with the combined carriers to separate the three individual carriers and to redirect each carrier to the appropriate audience member by adjusting either the diffraction element surface characteristics or by shifting the diffraction element to alter the angle of incidence between the diffraction element and the incoming combined carriers. Smart diffraction gratings, using magnetically adjusted diffraction surfaces or piezoelectric adjusted diffraction elements, or other programmable micro diffraction grating elements, may be used by the method to dynamically adjust the diffraction element surface according to a subject's relative location. In an embodiment, a single diffraction element adjusts shifting each of the carriers accordingly. In an embodiment, each of three separate diffraction elements adjusts relative to the combined incoming characters. Each diffraction element separates the combined carriers and redirects a particular carrier toward an audience member located at a particular location relative to the source.

Each LED has a narrow band of output frequencies. The combination of the red, green, and blue frequency light appears as white light. In this embodiment, the modulated carriers are transmitted from a source toward a receiver. In an embodiment, the modulated carriers interact with a refractive or diffractive element. The interaction separates the constituent carriers according to frequency or wavelength with each carrier proceeding at an angle from the interaction point and each angle determined by the frequency of the carrier. In this embodiment, the combined carriers incident upon the element as white light are split into individual red, green, and blue carrier light beams, each beam proceeding at a distinct exit angle from the interaction. Each exit angle depends upon the angle of incidence of the combined incoming carriers and the structure of the element. In an embodiment, the incoming carriers interact with a diffraction grating and are split according to wavelength. In this embodiment, dynamically altering the structure of the diffraction grating or moving the grating to alter the angle of incidence of the diffraction grating with the incoming carriers alters the respective exit angles of the red, green, and blue carriers.

Each audience member utilizes an augmented reality (AR) device incorporating a Li-Fi receiver. The AR device includes a display element configured to enable the combination of received data with the surroundings visible to the user into the augmented output. As an example, a user views their environment and the AR device augments their view by augmenting their view of the environment with additional information about one or more items visible in the viewed environment or with additional information regarding the relative position of the audience member and the data source. The Li-Fi receiver scans for each of the possible RGB frequencies and demodulates data from any RGB carriers detected.

In an embodiment, the configuration of each AR receiver enables the reception and demodulation of a single frequency carrier. The AR receiver may have a selection feature enabling a choice among a set of frequencies, or the carrier frequency may be fixed for each receiver. In this embodiment, the AR receiver only receives and demodulates the selected carrier. In this embodiment, only audience members correctly positioned relative to the source receive the augmented output. As an example, an audience member—museum visitor—stands at a location designated by an indicia on the floor, or a sign indicating the location. At the location, the AR device of the visitor receives the optical carrier modulated with a data file, the AR device demodulates the data and provides it to the visitor. Once the visitor moves from the designated location, the AR device no longer receives the optical carrier and the modulated data.

After demodulating the data from the carrier, the AR system augments the current view by adding the demodulated data to the output of the display element. In an embodiment, the data available for audience members varies according to their location relative to the source. After interacting with either a reflection or transmission diffraction element, the separated modulated carriers proceed at an exit angle determined according to the wavelength of the carrier. The potential audience members are categorized according to which of the three carriers their AR devices will find and demodulate. The method selects data having a unique direction-based context for each carrier such that the different categories of audience members each receive information having unique context according to their direction and location relative to the source. AR receivers display the direction-based data or relative location data, providing an indication of the relative location of the receiver.

In an embodiment, the source system receives information relating the respective relative locations of potential audience members. In this embodiment, the information originates from an Internet of things (IoT) environment, or a set of sensors which scan the local environment and identify the locations of potential audience members relative to the source system. In this embodiment, the IoT sensors feed audience member location data to the source system. The source system uses the IoT sensor data to determine audience member locations and then to track the movement of audience members to continuously determine the location of the audience members. The IoT sensors may include ultrasonic or infrared sensors which detect audience members, or the IoT sensors may include antennas which detect active transponder signals originating from audience member sensors or audience member AR devices. The source system receives triangulated location data calculated by a set of IoT antennae sensing the active signals. In an embodiment, the IoT data includes location data actively using radio frequency signals to ping or otherwise interact with passive radio frequency labels carried by audience members or attached to audience member AR systems.

In an embodiment, the source system adjusts to the IoT location information. In this embodiment, the source system may adjust the diffraction element surface to shift the exit angle for the carriers in order to expose the audience members to the diffracted carrier. In an embodiment, the source system alters the position of the diffraction element relative to the carrier source, again to bring the audience members into the beams of the separated carriers.

Combining the location data for multiple audience members enables the method to identify audience member category boundaries and to track changes in the boundaries and movement of the boundaries as audience members move. The method then alters the diffraction element relative to the source to alter the exit angle of the respective beams, adjusting the exit angle as audience member category boundaries change. In an embodiment, the method tracks directional data associated with the shifting boundaries.

In an embodiment, the source system includes three separate diffraction elements disposed in the path of the combined carriers. In this embodiment, the source system adjusts each of the three diffraction elements independently. Each diffraction element adjusts to alter the path of a single carrier, shifting the outgoing path of that carrier to expose particular audience members to the carrier. In this embodiment, the diffraction element surface may adjust or the position of the diffraction element relative to the combined source adjusts to produce the desired alteration in the outgoing carrier path. The system includes a separate diffraction element for each carrier such that the outgoing angle for each carrier can be adjusted independently of the exit angles of the other carriers.

In an embodiment, the system includes multiple different diffraction elements such that the locations of particular identified portions of an audience relative to the source may be tracked. In this embodiment, the method adjusts a diffraction element associated with that audience segment, following the movement of the audience segment with the desired optical carrier and data.

In an embodiment, the method alters the frequency of the optical carrier as an identified audience segment, or audience member moves relative to the source. In this embodiment, the method shifts the optical carrier associated with the data for the audience segment as the segment moves beyond the adjustment range of the associated diffraction element. As an example, the method identifies an audience segment and sends direction specific data to the audience segment using a red optical carrier. The method tracks the movement of the audience segment. As the audience segment moves beyond the adjustment range of the red diffraction element—the diffraction element cannot be adjusted sufficiently to move the diffracted output to the audience segment location—the method shifts the directional data for the audience segment to another optical carrier (e.g., a blue optical carrier) and utilizes the blue diffraction element to move the diffracted blue optical carrier to the location of the audience segment.

In an embodiment, each AR system includes IoT data receivers to capture WiFi or other wireless information from the IoT sensors. In this embodiment, the AR system determines its location relative to the source system and adjusts its scans of incoming carrier signals, scanning only for the frequency associated with its location relative to the source. As an example, an AR system disposed relative to the source in an area where a diffracted red carrier would exit the diffraction element, will scan for the red frequency carrier and demodulate the received red carrier, augmenting the display with the demodulated direction-based data.

Figure 2:
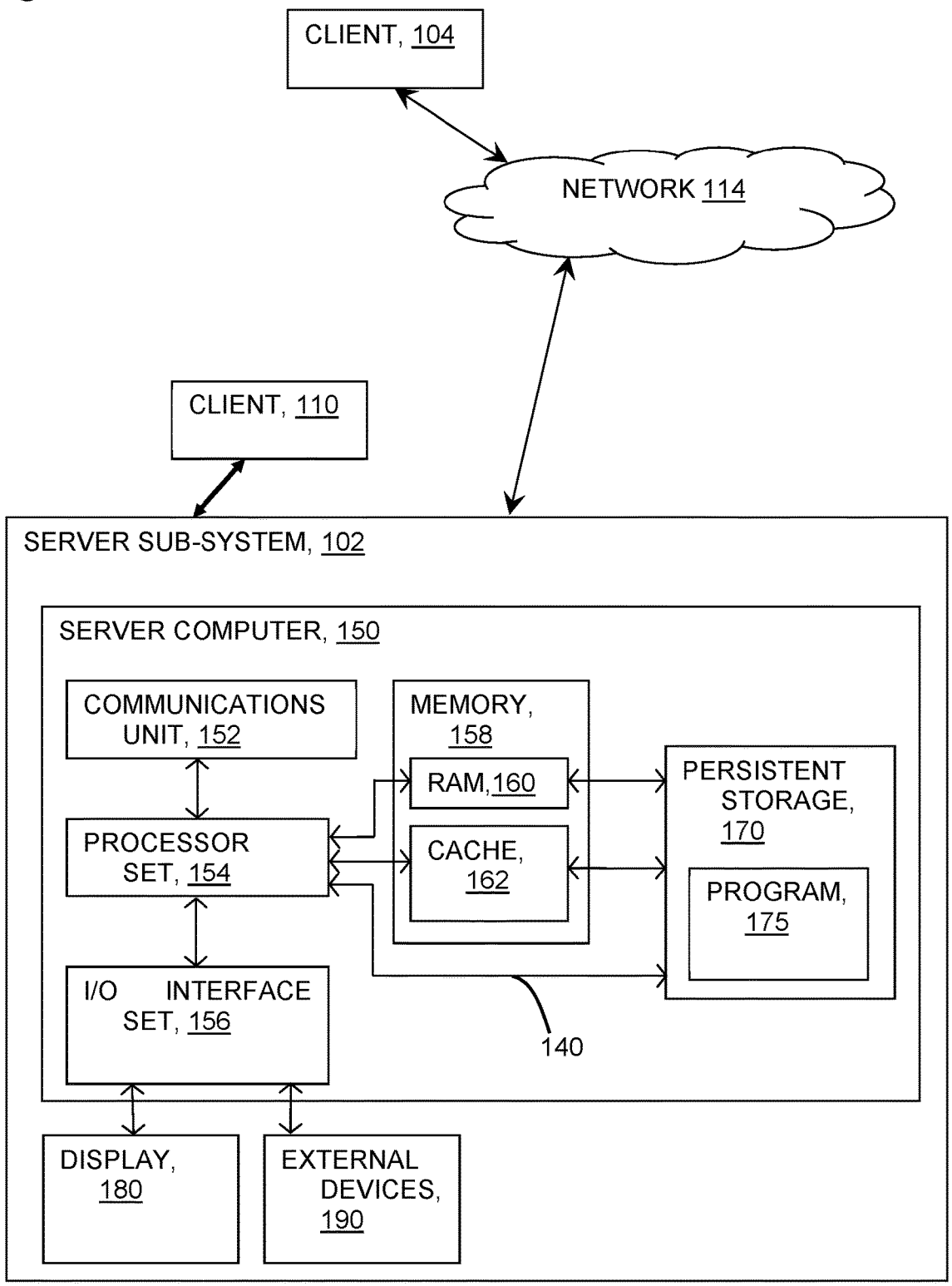
FIG. 2 provides a schematic illustration of a computing environment, according to an embodiment of the invention.

FIG. 2 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise IoT location sensors, AR receivers, adjustable diffraction elements, and associated information delivery programs (not shown) together with sufficient computing resource (processor, memory, network communications hardware) to execute the program. In an embodiment, client device 110 function as AR receivers for audience members receiving direction dependent data from server sub-system 102. Client device 104 functions as the adjustable diffraction element which adjusts the optical carrier path according to the relative position of client device 110 and server sub-system 102. As shown in FIG. 2, server sub-system 102 comprises a server computer 150. FIG. 2 depicts a block diagram of components of server computer 150 within a networked computer system 1000, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the information delivery program 175, are stored in persistent storage 170 for execution and/or access by one or more of the respective processor(s) 154 of server computer 150 via cache 162. Persistent storage 170 provides data for transmission via optical carriers to client device 110In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as data modulated LEDs, keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., information delivery program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 3:
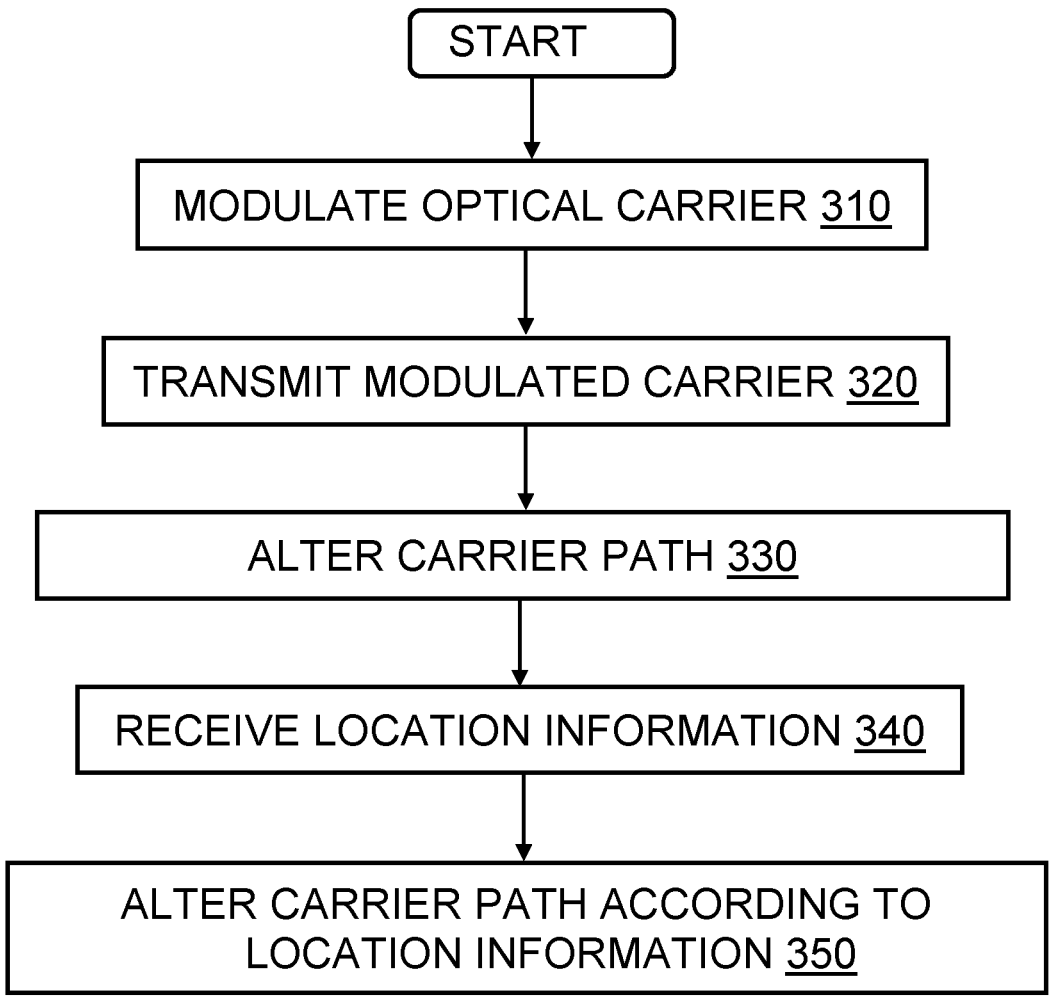
FIG. 3 provides a flowchart depicting an operational sequence, according to an embodiment of the invention.

FIG. 3 provides a flowchart 300, illustrating exemplary activities associated with the practice of the disclosure. After program start, at block 310, processor set 154 modulates an optical carrier with a data file from memory 158, or persistent storage 170. The LED associated with the carrier transmits the modulated carrier at block 320. In an embodiment, a plurality of LEDs transmits a plurality of different frequency optical carriers, each optical carrier modulated with a different data file. The different data files containing data having direction-dependent context. The direction dependent context varying according to the location of a recipient relative to the source system. In an embodiment, if observed after transmission and before diffraction, the combined optical carriers may be perceived as white light, depending upon the relative amplitudes of the LED optical carriers. At block 330, an interaction between the optical carrier and a diffraction or refraction element alters the original path of the optical carrier. At block 340, the source system receives information regarding the location of one or more audience members relative to the source system. At block 350, the source system alters the diffraction or refraction element to alter the path of the optical carrier such that the new carrier path intersects with the one or more audience member's location. In an embodiment, the system alters the optical carrier from one color to another color to enable adjustment of the diffraction element to intersect the new carrier path and the audience member's location.

In an embodiment, the system receives audience member location information and determines an initial diffraction element position according to the initial audience member location. In this embodiment, the system adjusts the diffraction element position as the audience member moves relative to the source.

In an embodiment, the audience member's AR device receives the modulated optical carrier and demodulates the data file from the carrier. The AR device augments the display element for the user, adding the demodulated data to the display. The demodulated data includes data contextually associated with the location of the AR device and audience member relative to the source system.

In an embodiment, the AR device receives and demodulates each of several different optical carriers. The AR device further receives IoT network sensor location data associated with the location of the AR device relative to the source of the optical carriers. In this embodiment, the AR system demodulates the optical carrier associated with the location of the AR device relative to the optical carrier source and augments the user display with the data demodulated from the carrier.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
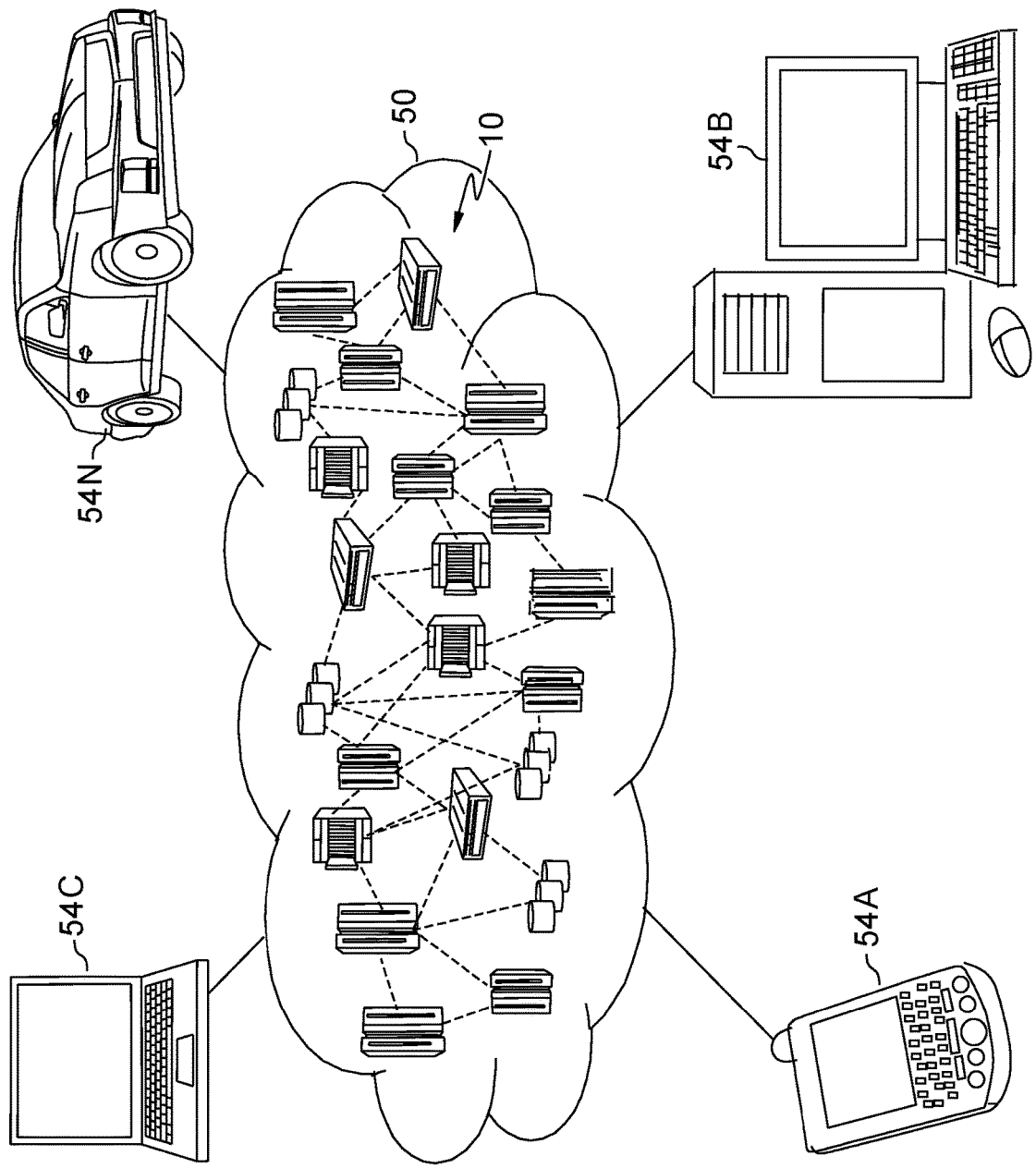
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
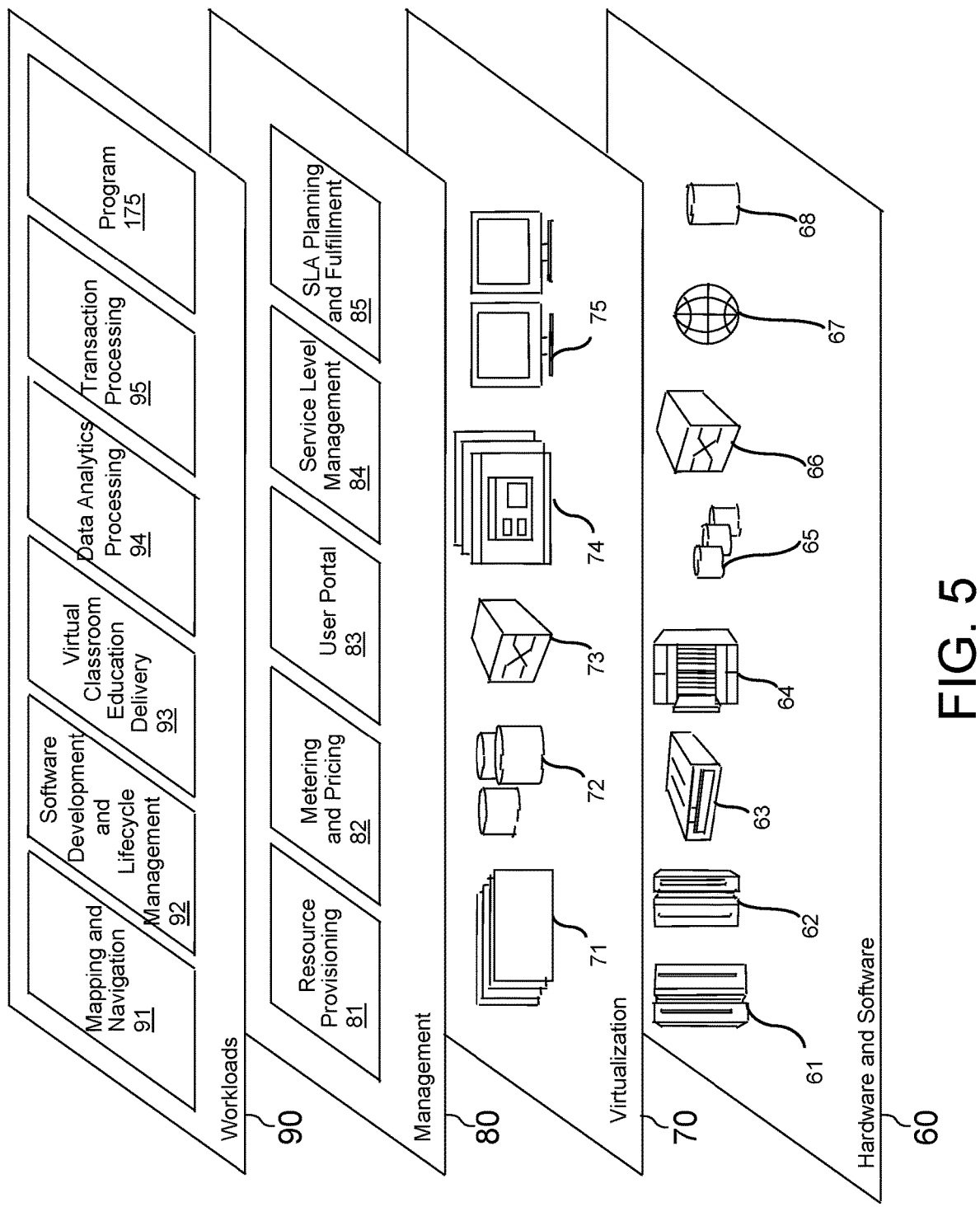
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information delivery program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for delivering information according to a recipient's location, the method comprising:
    receiving an initial location for a recipient;
    selecting data having a unique direction-based context according to the initial location for the recipient;
    modulating an optical carrier according to the data;
    transmitting the optical carrier in a first direction from the source;
    altering a path of the optical carrier according to an optical carrier wavelength and the initial recipient location relative to the source;
    receiving recipient location information following movement of the recipient;
    altering the optical carrier wavelength or optical carrier path according to the recipient location information; and
    continuing to transmit the data set using the altered optical carrier wavelength or altered optical carrier path.

2. The computer implemented method according to claim 1, further comprising:
    modulating a plurality of optical carriers according to a plurality of data sets, each optical carrier modulated according to one data set, each optical carrier comprising a different wavelength;
    transmitting the plurality of optical carriers in the first direction;
    altering a path of each optical carrier according to an optical carrier's wavelength; and
    altering each optical carrier wavelength or optical carrier path according to the recipient location information.

3. The computer implemented method according to claim 1, further comprising altering an optical carrier diffraction element according to the recipient location information.

4. The computer implemented method according to claim 3, further comprising altering an angle of incidence between the optical carrier diffraction element and the optical carrier.

5. The computer implemented method according to claim 3, further comprising altering a surface of the optical carrier diffraction element.

6. The computer implemented method according to claim 1, further comprising tracking the recipient's location and altering the optical carrier wavelength or optical carrier path according to the recipient's location.

7. The computer implemented method according to claim 1, further comprising modulating a different optical carrier according to the data set and according to the recipient's location information.

8. A computer program product for delivering information according to a recipient's location, the computer program product comprising one or more computer readable storage devices and program instructions collectively stored on the one or more computer readable storage devices, the program instructions comprising:
    program instructions to receive an initial location for a recipient;
    program instructions to select data having a unique direction-based context according to the initial recipient location relative to a source;
    program instructions to modulate an optical carrier according to the data;
    program instructions to transmit the optical carrier in a first direction from the source;
    program instructions to alter a path of the optical carrier according to an optical carrier wavelength and the initial recipient location;
    program instructions to receive recipient location information following movement of the recipient;
    program instructions to alter the optical carrier wavelength or optical carrier path according to the recipient location information; and
    continuing to transmit the data set using the altered optical carrier wavelength or altered optical carrier path.

9. The computer program product according to claim 8, the program instructions further comprising:
    program instructions to modulate a plurality of optical carriers according to a plurality of data sets, each optical carrier modulated according to one data set, each optical carrier comprising a different wavelength;
    program instructions to transmit the plurality of optical carriers in the first direction; program instructions to alter the path of each optical carrier according to an optical carrier's wavelength; and
    program instructions to alter each optical carrier wavelength or optical carrier path according to the recipient location information.

10. The computer program product according to claim 8, the program instructions further comprising program instructions to alter an optical carrier diffraction element according to the recipient location information.

11. The computer program product according to claim 10, the program instructions further comprising program instructions to alter an angle of incidence between the optical carrier diffraction element and the optical carrier.

12. The computer program product according to claim 10, the program instructions further comprising program instructions to alter a surface of the optical carrier diffraction element.

13. The computer program product according to claim 8, the program instructions further comprising program instructions to track the recipient's location and alter the optical carrier wavelength or optical carrier path according to the recipient's location.

14. The computer program product according to claim 8, the program instructions further comprising program instructions to modulate a different optical carrier according to the data set and according to the recipient's location information.

15. A computer system for delivering information according to a recipient's location, the computer system comprising:
one or more computer processors;
one or more computer readable storage devices; and
stored program instructions on the one or more computer readable storage devices for execution by the one or more computer processors, the stored program instructions comprising:
program instructions to receive an initial location for a recipient;
program instructions to select data having a unique direction-based context according to the initial recipient location relative to a source;
program instructions to modulate an optical carrier according to the data;
program instructions to transmit the optical carrier in a first direction from the source;
program instructions to alter a path of the optical carrier according to an optical carrier wavelength and the initial recipient location relative to the source;
program instructions to receive recipient location information following movement of the recipient;
program instructions to alter the optical carrier wavelength or optical carrier path according to the recipient location information; and
continuing to transmit the data set using the altered optical carrier wavelength or altered optical carrier path.

16. The computer system according to claim 15, the program instructions further comprising:
program instructions to modulate a plurality of optical carriers according to a plurality of data sets, each optical carrier modulated according to one data set, each optical carrier comprising a different wavelength;
program instructions to transmit the plurality of optical carriers in the first direction; program instructions to alter the path of each optical carrier according to an optical carrier's wavelength; and
program instructions to alter each optical carrier wavelength or optical carrier path according to the recipient location information.

17. The computer system according to claim 15, the program instructions further comprising program instructions to alter an optical carrier diffraction element according to the recipient location information.

18. The computer system according to claim 17, the program instructions further comprising program instructions to alter an angle of incidence between the optical carrier diffraction element and the optical carrier.

19. The computer system according to claim 17, the program instructions further comprising program instructions to alter a surface of the optical carrier diffraction element.

20. The computer system according to claim 15, the program instructions further comprising program instructions to track the recipient's location and alter the optical carrier wavelength or optical carrier path according to the recipient's location.

* * * * *